3,138,569
EPOXIDE PLASTICIZERS AND STABILIZERS
FOR VINYL RESINS
Pierre Lafont, Lyon, France, assignor to Societe des
Usines Chimiques Rhone-Poulenc, Paris, France, a
French body corporate
No Drawing. Filed May 12, 1961, Ser. No. 109,530
Claims priority, application France May 17, 1960
6 Claims. (Cl. 260—30.4)

This invention relates to the use of certain epoxides derived from cyclododeca-1,5,9-triene as plasticizers and stabilizers for polymers of halogen containing vinyl compounds. The term "vinyl compound" as used herein is to be taken to include compounds containing the vinylidene radical.

It is known that polymers of halogen containing vinyl compounds such as vinyl chloride and vinylidene chloride tend to liberate the corresponding hydrogen halide when treated at elevated temperature, which produces a discoloration of the products and corrosion of the apparatus employed.

It has now been found that certain saturated and unsaturated mono- and di-epoxides derived from cyclododeca-1,5,9-triene are excellent stabilizers and plasticizers for halogen containing vinyl resins.

According to the present invention there is provided a composition comprising a polymer of a halogen containing vinyl compound and as plasticizer and/or stabilizer therefor an epoxide which is 1,2-epoxycyclododeca-5,9-diene, 1,2-epoxycyclododecane, 1,2:5,6-diepoxycyclododecane or 1,2:5,6-diepoxycyclododec-9-ene.

These epoxides may be prepared by oxidation of cyclododeca-1,5,9-triene with organic peroxides or peracids whereby the corresponding unsaturated mono- and di-epoxides are obtained, followed if desired by hydrogenation of these unsaturated compounds whereby the corresponding saturated mono- and di-epoxides are obtained.

For the purpose of obtaining thermal stability of the polymer it is sufficient to employ from 1 to 10, preferably from 1 to 3, parts by weight of the epoxide per 100 parts of the resin, which may be, for example, polyvinyl chloride containing a conventional plasticizer, such as a phthalic ester.

In order to obtain both, good thermal stability and good plasticization of the polymers, it is necessary to include in the compositions 10 to 80, preferably 30 to 60, parts by weight of the epoxide per 100 parts of the polymer.

The following examples, in which the parts referred to are by weight, will serve to illustrate the invention.

*Example I*

Various samples were prepared from a basic composition containing 50 parts of high-viscosity polyvinyl chloride (marketed under the trademark Rhodopas XTR) and 50 parts of dioctylphthalate. One of these samples was kept as a control and there were added to each of the others 1.5 parts of one of the following stabilizers: barium stearate, bisphenol glycidic ether (marketed under the name "Stabilizer E 90"), 1,2-epoxycyclododeca-5,9-diene, 1,2-epoxycyclododecane and 1,2:5,6-diepoxycyclodec-9-ene.

The coloration exhibited by each sample after heating at 180° C. for 30 minutes was examined and the results were as follows:

Control sample_____ Dark orange.
Sample with barium stearate_____ Dark orange.
Sample with "Stabilizer E 90"_____ Bright orange.
Sample with 1,2 - epoxycyclododeca-
  5:9-diene_____ Pale orange.
Sample with 1,2-epoxycyclododecane_ Pale orange.
Sample with 1,2:5,6-diepoxycyclodo-
  dec-9-ene_____ Very pale orange.

These results indicate that the compositions containing the epoxide stabilizers according to the present invention are thermally more stable than those containing the previously known stabilizers.

*Example II*

Compositions were prepared each containing 65% of high-viscosity polyvinyl chloride (marketed under the trademark Rhodopas XHPC) and 35% of one of the following plasticizers: 1,2-epoxycyclododeca-5,9-diene, 1,2-epoxycyclododecane, 1,2:5,6-diepoxycycodec-9-ene, 1,2:5,6-diepoxycyclododecane and, for the purpose of comparison, dioctylphthalate.

The compositions were calendered at 140° C. and sheets obtained therefrom were compressed at 140° C. The tensile strengths and the elongations at rupture were measured with the aid of an Amsler (Schaffhausen, Switzerland) dynamometer and the volume resistivity was measured for a 1 mm. thickness of the sheets. The measurements of tensile strength and elongation at rupture were made according to ASTM D–638–49T.

The results obtained were as follows:

| Plasticizer employed | Tensile strength, kg./cm.$^2$ | Elongation at rupture (percent) | Volume resistivity in ohms/cm. |
|---|---|---|---|
| Dioctylphthalate | 140 | 270 | $6.5 \times 10^{12}$ |
| 1,2-Epoxycyclododeca-5,9-diene | 220 | 240 | $5 \times 10^{14}$ |
| 1,2-Epoxycyclododecane | 230 | 200 | $9 \times 10^{14}$ |
| 1,2:5,6-Diepoxycyclododecane | 240 | 250 | $9 \times 10^{14}$ |
| 1,2:5,6-Diepoxycyclododec-9-ene | 250 | 280 | $6 \times 10^{14}$ |

These results show that, with comparable elongations at rupture, the mechanical and electrical properties of the compositions plasticized by the mono- and diepoxides in accordance with the present invention are clearly superior to those of the composition containing dioctylphthalate.

I claim:
1. A composition comprising a polymer of a vinyl halide and as plasticizer and stabilizer therefor an epoxide compound selected from the class consisting of 1,2-epoxycyclododeca - 5,9 - diene, 1,2-epoxycyclododecane, 1,2:5,6-diepoxycyclododecane and 1,2:5,6-diepoxycyclododec-9-ene.

2. A thermally stable composition comprising a polymer of a vinyl halide and an epoxide compound selected from the class consisting of 1,2-epoxycyclododeca-5,9-diene, 1,2-epoxycyclododecane, 1,2:5,6-diepoxycyclododecane and 1,2:5,6-diepoxycyclododec-9-ene, the said epoxide compound being present in amount of 1 to 10 parts by weight per 100 parts of the polymer.

3. A thermally stable composition comprising a polymer of a vinyl halide and an epoxide compound selected from the class consisting of 1,2-epoxycyclododeca-5,9-diene, 1,2-epoxycyclododecane, 1,2:5,6-diepoxycyclododecane and 1,2:5,6-diepoxycyclododec-9-ene, the said epoxide compound being present in amount of 1 to 3 parts by weight per 100 parts of the polymer.

4. A thermally stable, plasticized composition comprising a polymer of a vinyl halide and an epoxide compound selected from the class consisting of 1,2-epoxycyclododeca-5,9-diene, 1,2-epoxycyclododecane, 1,2:5,6-diepoxycyclododecane and 1,2:5,6-diepoxycyclododec-9-ene, the said epoxide compound being present in amount of 10 to 80 parts by weight per 100 parts of the polymer.

5. A thermally stable, plasticized composition comprising a polymer of a vinyl halide and an epoxide compound selected from the class consisting of 1,2-epoxycyclododeca-5,9-diene, 1,2-epoxycyclododecane, 1,2:5,6-diepoxycyclododecane and 1,2:5,6-diepoxycyclododec-9-ene, the said epoxide compound being present in amount of 30 to 60 parts by weight per 100 parts of the polymer.

6. A composition comprising polyvinyl chloride and as plasticizer and stabilizer therefor an epoxide compound selected from the class consisting of 1,2-epoxycyclododeca-5,9-diene, 1,2-epoxycyclododecane, 1,2:5,6-diepoxycyclododecane and 1,2:5,6-diepoxycyclododec-9-ene.

References Cited in the file of this patent
UNITED STATES PATENTS

| | | |
|---|---|---|
| 2,973,373 | Phillips et al. | Feb. 28, 1961 |
| 2,999,866 | Starcher et al. | Sept. 12, 1961 |
| 2,999,867 | Starcher et al. | Sept. 12, 1961 |
| 3,014,048 | Tinsley et al. | Dec. 19, 1961 |
| 3,014,928 | Wilke | Dec. 26, 1961 |